May 20, 1924.
F. D. SHELDON
ROLLER BEARING
Original Filed April 19, 1918    2 Sheets-Sheet 1
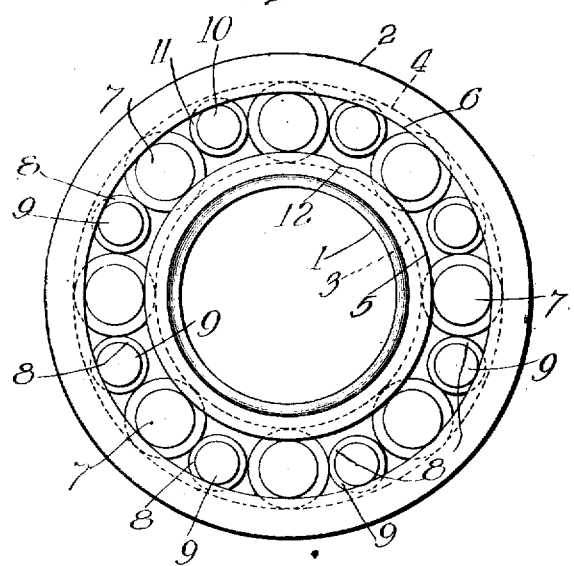
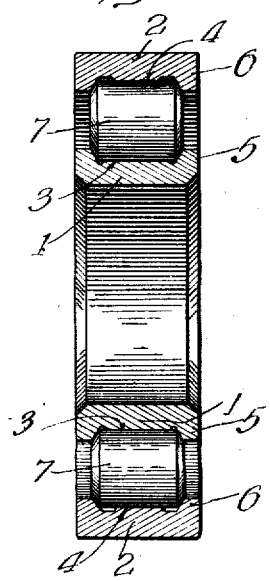
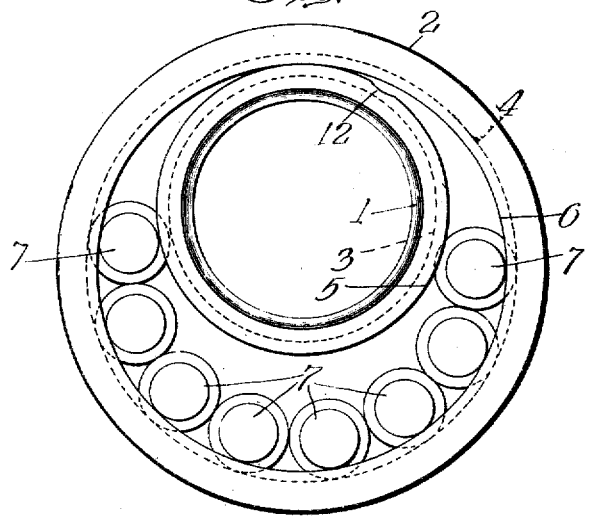
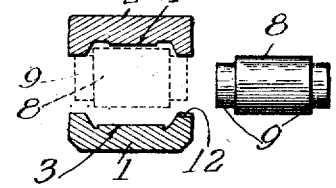
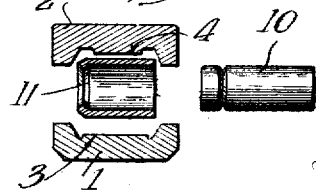
Witnesses:
W. F. Kilroy
Harry R. L. White
Inventor
Frank D. Sheldon
By Emery, Booth, Janney & Varney
Attys.

May 20, 1924.
F. D. SHELDON
ROLLER BEARING
Original Filed April 19, 1918    2 Sheets-Sheet 2
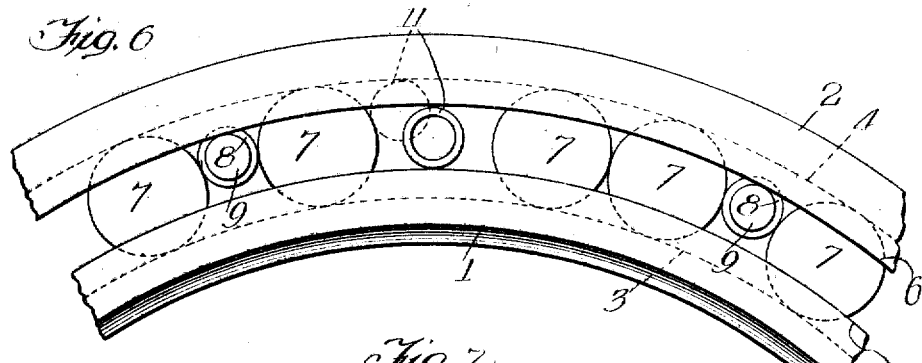
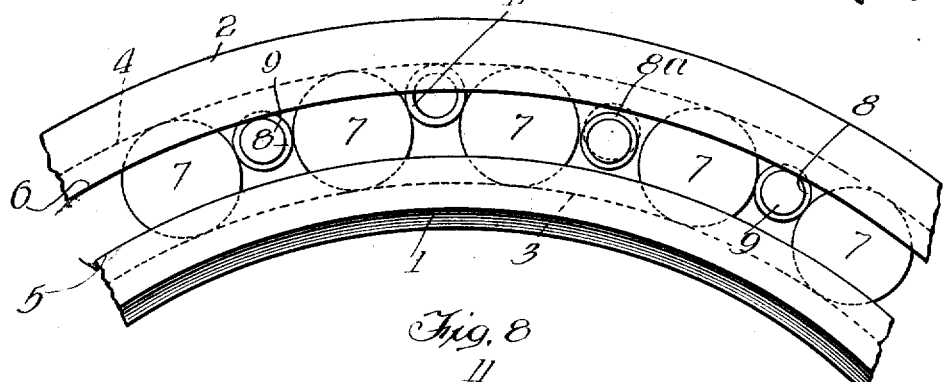
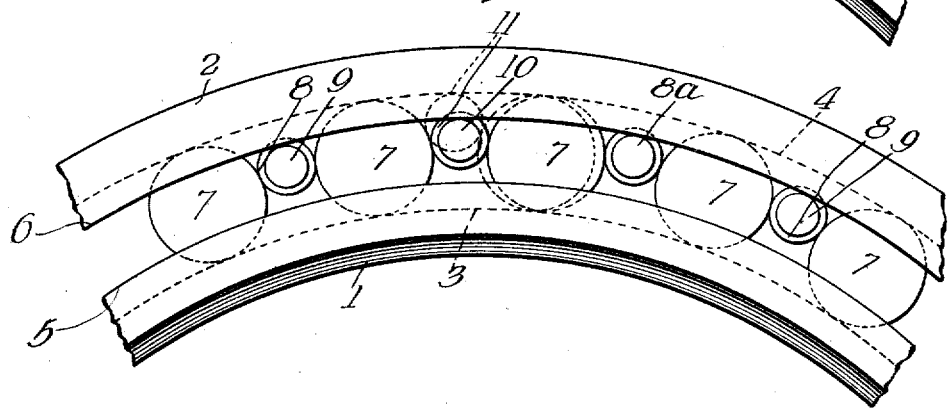
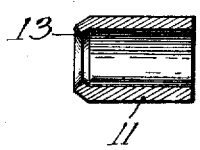

Patented May 20, 1924.

1,494,638

UNITED STATES PATENT OFFICE.

FRANK D. SHELDON, OF CHICAGO, ILLINOIS, ASSIGNOR TO WILLIAM L. O'CONNELL, OF CHICAGO, ILLINOIS.

ROLLER BEARING.

Application filed April 19, 1918, Serial No. 229,568. Renewed November 2, 1923.

*To all whom it may concern:*

Be it known that I, FRANK D. SHELDON, a citizen of the United States, residing at Chicago, in the county of Cook and State of Illinois, have invented certain new and useful Improvements in Roller Bearings, of which the following is a specification.

My invention relates to antifriction bearings, and more particularly to bearings of the type in which rollers of different diameters are confined between the race rings.

One object is to provide an improved bearing of this character capable of being readily assembled, the race rings of which may consist of solid undivided annuli without lateral filling notches, or at least without notches of such character as to interrupt the continuity of the effective thrust-sustaining shoulders of the race ways.

A further object is to provide an efficient bearing adapted to service under high speed conditions and one of relatively simple and commercially practicable construction; also to minimize conditions contributing to friction and to obtain certain other advantages.

The invention will be described with reference to the annexed drawings and particularly pointed out in the claims.

Referring to the drawings:

Figure 1 is a side elevation of a roller bearing embodying my invention.

Figure 2 is a cross section of the same.

Figure 3 is a side view illustrating the first step in the act of assembling, or the last step in the act of taking the bearing apart.

Figure 4 is a cross section through the race rings with a side view of one of the small rollers about to be inserted, and showing the latter after insertion in dotted lines.

Figure 5 is a similar view showing a separable pin about to be inserted to complete the act of assembling.

Figure 6 is a diagrammatic view of a segment of the bearing, with proportions exaggerated, illustrating the step preceding the insertion of the last roller.

Figure 7 is a similar view illustrating the insertion of the last roller.

Figure 8 is a similar view illustrating the last act of assembling.

Figures 9 and 10 are detailed views of a separable roller shell and core.

In the drawings numerals 1 and 2 designate a pair of concentric rings or annuli, having roller tracks 3—4 and flanges 5—6 on their confronting surfaces and embracing between them a series of alternating large and small rollers 7 and 8. The large rollers 7 bear on the tracks and are engaged or retained laterally by the flanges of both rings, while the small rollers 8, which are individually capable of insertion between side walls of the rings, are each held by the radial thrust of the series in position to bear on and be laterally retained by the flanges of one ring but off the track of the large rollers. As shown, the small rollers have reduced ends or trunnions 9, which bear on the flanges 6 of the outer ring, these being the only parts in sliding contact, and the intermediate enlarged bodies of the rollers are in rolling contact with the adjacent rollers and furnish end shoulders for lateral retention by said flanges 6. The series being sufficiently close to maintain the relation stated, it is obvious that the rollers are positively retained within and by the rings.

One or more of the small rollers, however, has a removable core 10 constituting its trunnions. This core can be pushed out endwise to permit the shell 11 of that roller to be displaced radially outward, or toward the track from which it is withheld, to loosen the series of rollers as a whole and thereby permit the other small rollers to be released from the outer ring sufficiently to be pushed out endwise through the annular space between the side walls of the rings; or, if said rollers are of greater diameter than the width of said space, to be pushed out through a small notch or depression 12 in one of the flanges of the inner annulus. Whether such a notch is needed is entirely a matter of design, depending obviously upon the relative proportioning of the rings, flanges and small rollers. The notch is inconsiderable as compared with a common filling notch, nor does it interrupt the continuity of the effective thrust sustaining shoulders or flanges of the rings, even though, as may be possible under some conditions, it were deeper than shown.

When all of the small rollers have been thus removed, the large rollers may be assembled in contact with each other, as indicated in Figure 8, after which the inner ring or annulus can be removed by placing it eccentrically and forcing it out while tilting it and slightly springing or distorting the rings; the large rollers being preferably of such number and size as to require this procedure or some equivalent or analogous method in disorganizing the bearing and the converse thereof in reassembling.

By the reverse operation the bearing may be assembled, the roller shell having the removable core being inserted and displaced radially before the last of the other small rollers, and the last operation being the insertion of the removable core in that shell. To insert it the shell is forced radially inward, taking up the clearance and crowding or tightening the series of rollers, and when in place it prevents radial displacement of said shell sufficient to loosen the series, thus constituting a locking means to maintain the assembly.

The method of assembling, after having put together the large rollers and inner ring as hereinbefore indicated, is diagrammatically illustrated in Figures 6, 7 and 8, in which the relative dimensions of the rollers are changed to exaggerate the clearances. Figure 6 shows the positions of the rollers before the last small roller has been inserted, indicating how the roller shell 11 can be displaced to the dotted line position. Figure 7 shows the last small roller, marked 8ª, being inserted between two adjacent large rollers while the shell 11 is displaced. Figure 8 shows the roller shell 11 restored to its essential position and the core 10 inserted therein, thus taking up the clearance and causing the series of rollers to tighten in the rings.

The roller and shell may be constructed as shown in Figures 9 and 10, one tightly fitted on the other and the shell having a contracted end 13 which engages a groove 14 in the core to lock the latter against accidental removal. Preferably the outside diameter of the core is equal to the inside diameter of the shell.

Under some conditions, depending upon proportions, it may be necessary to provide two, though rarely if ever more than two, of the small rollers with removable cores in order to obtain the clearance needed to admit the last roller in assembling. In most cases one such roller will suffice, though as many may be provided with separate cores as desired.

The load is transmitted principally by the large rollers but partially by the small ones. The proportioning of the load is a matter of design and depends upon the relation of the axes of the small rollers to the circle of centers of the large rollers. The nearer the axes of the small rollers are brought to the direct line of thrust between the centers of the large rollers, the less their load. Thus the small rollers function more or less as idlers.

It will be observed that the inner surfaces of the flanges 5 and 6 and the coacting end surfaces of the large rollers are inclined, which is to relieve friction by providing only a momentary line contact between said flanges and the portions of the end surfaces of the rollers in engagement therewith at any given instant; in other words, the contact between the end surfaces of the rollers and the inner surfaces of the flanges will be along lines coinciding with the radii of both the rings and the rollers and hence only momentary. The inclination of the surfaces referred to also effects a partial resolution of the side thrust in a radial direction.

Another feature contributing to the reduction of friction is that the roller track 4 is formed as a raised portion of the outer annulus, leaving annular depressions between the track and inner surfaces of the flanges 6, which is to prevent jamming if the rollers get aslant or slightly out of parallelism with the axis of the bearing, since under such conditions the ends of the rollers will be free from contact with the rings by virtue of such depressions.

The means described for permitting assembling or disassembling and locking the rollers in their effective radial positions to maintain the assembly of the bearing may be applied to bearings of different designs and details of construction from that shown and in which the number, proportions and relative arrangements of the rollers may be variously modified; though I believe the most practical arrangement is as illustrated.

While I have described my invention as embodied in a bearing capable of transmitting lateral pressure or end thrust in both directions, and requiring the eccentric displacement method for inserting the load-sustaining rollers, the invention in its broad aspect is also applicable to bearings adapted to sustain only radial pressure, or to take end thrust in only one direction, or in which, though capable of sustaining end thrust in both directions, one or more of the ring flanges may be made separable or detachable in order to permit assembly of the rings and load sustaining rollers otherwise than by the eccentric displacement method. Assume, for instance, that one or both of the flanges of the inner ring should be removed, so that the bearing could no longer take end thrust or could take it only in one direction, as the case may be, though the entire series of rollers would still be retained laterally by the outer ring. This arrangement would permit the inner ring to be inserted concentrically while the series of rollers are in place, and the same result would be obtained by making one of the flanges of the inner ring separable or detachable. With such arrangements, however, it will still be desirable to retain the assembling feature described, since the relation and condition of tightness of the rollers is such that the last small roller could not be inserted in its place between adjacent large rollers until a radial displacement of one of the small rollers is effected as previously described.

The term "roller" is to be understood to include other or equivalent rolling elements which may be used in bearings embodying my invention.

Having now described my invention, I claim:

1. A roller bearing comprising a pair of concentric rings and an interposed series of rollers of different sizes in a relation whereby the large rollers bear on both rings and are retained laterally by at least one of them and the small rollers, in rolling contact with the others, each bears on one ring off the track of the large rollers and is retained laterally thereby, one or more of the small rollers being radially displaceable to obtain clearance for the admission of the last roller in assembling, and means normally preventing such displacement.

2. A roller bearing comprising a pair of concentric rings and an interposed series of rollers of different sizes in a relation whereby the large rollers bear on both rings and are retained laterally by at least one of them and the small rollers, in rolling contact with the others, each bears on one ring off the track of the large rollers and is retained laterally thereby, one or more of said rollers having a separate core which retains its essential radial position to preserve the relation stated.

3. A roller bearing comprising concentric rings and interposed rollers of different sizes in a relation whereby the large rollers bear on and are retained laterally by both rings while the small rollers are retained laterally by said rings but are withheld by one of the rings from its bearing track for the large rollers; one or more of the small rollers being laterally displaceable toward the track from which it is normally withheld, so as to obtain clearance for admission of the last roller in assembling; and means normally preventing such displacement.

4. A roller bearing comprising a pair of concentric rings and an interposed series of rollers of different sizes in a relation whereby the large rollers bear on and are retained laterally by both rings and each of the small rollers is retained laterally and withheld by one ring off the track of the large rollers, one or more of said small rollers having a separate core which retains said roller in its proper relation.

5. A roller bearing comprising rings and interposed rollers of different sizes, the large rollers travelling on and having lateral engagement with both rings, and the smaller rollers bearing on one ring off the track of the large rollers and retained laterally thereby, one or more of the smaller rollers having separable means withholding it from the track of the large rollers and serving to maintain the bearing assembled in the relation stated.

6. A roller bearing comprising concentric rings and an interposed series of alternately large and smaller rollers, the large rollers tracking on and engaged laterally with both rings, and the smaller rollers each bearing on one ring off the track of the large rollers and retained laterally thereby, and separable means retaining one or more of said smaller rollers in its essential radial relation.

7. A roller bearing comprising rings and interposed rollers of different sizes, the larger rollers retained laterally by both rings, each of the smaller rollers being held radially in position for lateral retention by one of the rings, but having means contacting therewith withholding it from the roller track thereof, said means of one or more of said smaller rollers being separable to permit assemblage.

8. A roller bearing comprising rings and closely arranged rollers embraced thereby, including a roller of smaller diameter than the distance between the tracks of the rings, and means for maintaining said roller in a radial relation effective to exert pressure circumferentially and tighten the series.

9. A roller bearing comprising rings and interposed rollers mutually retaining each other against axial displacement, the series including a roller smaller than others, the body of which is radially displaceable, and having an insertible core to secure it against displacement.

10. A roller bearing comprising concentric rings having roller tracks and flanges on their opposed faces, rollers bearing on said tracks and engaged by said flanges, smaller rollers each held radially against the flanges of one ring and retained laterally thereby, at least one of the smaller rollers having separable means to hold it in such radial relation.

11. A roller bearing comprising concentric rings having roller tracks and flanges on their opposed faces, rollers bearing on said tracks and engaged by said flanges, smaller rollers between the others held radially against the flanges of one ring and retained laterally thereby, at least one of said smaller rollers having an inserted core, which maintains its radial position.

12. A roller bearing comprising concentric rings having roller tracks and flanges on their opposed faces, rollers bearing on said tracks and engaged by said flanges, smaller rollers held radially in position for lateral retention by the flanges of one ring, said rollers having trunnions bearing on said flanges and withholding said rollers from the track of the larger rollers, at least one of said smaller rollers having a separate core providing its said trunnions.

13. A roller bearing comprising concentric rings having roller tracks and shoulders on its opposed faces, rollers of such a number as can be inserted while the rings are eccentrically displaced bearing on said tracks engaging laterally with said shoulders, smaller rollers between the others adapted for lateral retention by the shoulders of a ring, said smaller rollers being individually insertible while the rings are concentric but in the complete assembly each occupying a position against one of the rings and in lateral retention by its shoulders but out of contact with its roller track, at least one of the smaller rollers having a separable part which preserves its radial relation in the complete assembly.

14. A roller bearing comprising rings and rollers mutually retained in assembled relation, and means for locking the assembly including a separable roller and core, which core retains said roller in its essential radial position.

15. A bearing comprising concentric rings and an interposed series of alternating large and small rollers, the small rollers bearing upon the outer ring off the track of the large rollers and retained laterally thereby, one or more of the small rollers having an inserted core retaining it in the relation stated.

16. A bearing comprising concentric rings having opposed roller tracks and an interposed series of contacting rollers and idlers, thrust-sustaining means for retaining the rings, rollers and idlers against axial displacement, at least one of said idlers being separable for purposes of assembly.

17. A roller bearing element consisting of a roller composed of a shell and separable core fitted one upon the other and having an interlocking connection.

18. A roller bearing comprising rings and interposed rollers of different sizes, the large rollers traveling on and laterally engaged by both rings, and the small rollers bearing on one ring off the track of the large rollers and laterally retained thereby, the engaging surfaces of the rings and large rollers being formed to restrict the contact substantially to radial lines coinciding with the radii of the rings and rollers.

19. A roller bearing comprising rings and interposed rollers of different sizes, the large rollers traveling on and laterally engaged by both rings, and the small rollers bearing on one ring off the track of the large rollers and laterally retained thereby, there being provision for clearance between the ends of the rollers and ring retaining the small rollers to prevent jamming if the rollers get aslant or out of true parallelism.

20. A roller bearing comprising concentric rings having roller tracks and flanges on their confronting faces, and rollers bearing on said tracks retained laterally by said flanges, there being annular depressions between a track and said flanges to allow disalinement of the rollers without jamming.

21. A roller bearing comprising concentric rings, and an interposed series of alternating large and small rollers, means retaining the small rollers in position off the bearing track of the large rollers, one or more of said small rollers being radially displaceable toward said track to obtain clearance for the admission of the last roller in assembling, and means normally preventing such displacement.

22. A roller bearing comprising concentric rings and interposed rollers in two sets of different diameters, the rollers of both sets being laterally retained by at least one ring but having independent bearing tracks thereon, one or more of the smaller rollers having a separable core for purposes of assembly.

23. A bearing comprising concentric rings and closely arranged rollers embraced thereby, including rollers small enough to pass between the rings which are crowded radially into engagement by one ring but off its track for the remaining rollers, said small rollers being releasable from such engagement by radial displacement of one or more of them, the latter having separate means to secure them against such displacement.

24. A method of assembling a roller-bearing of the unit-assembled type which includes introducing between the race-rings a number of rollers less than the whole of a series of rollers which in a predetermined relation will maintain the assembly, those so introduced including one or more of less diameter than the distance between the roller tracks of the rings; displacing one or more rollers of such specified diameter radially in a direction to allow clearance and introducing the remaining roller or rollers of the said series; then restoring such displaced roller or rollers to position to effect the predetermined relation stated and locking the same against radial displacement therefrom.

25. A method of filling a roller-bearing of the unit-assembled type which consists in inserting between the race-rings while relatively displaced a number of rollers of a diameter adapted to bear on and coact laterally with both rings when concentric, arranging the rings concentrically and separating said rollers therein, then inserting a number of smaller rollers capable individually of passing between the concentric rings, providing clearance to admit the last of the small rollers by crowding one or more of them toward a track of the larger rollers and, while so crowding, inserting the last of said small rollers, then moving one or more of said small rollers in the opposite direction to take up the clearance and inserting means to retain the same in the essential radial position to preserve the assembly of the bearing.

26. A roller bearing comprising concentric rings, interposed rollers tracking thereon, smaller rollers between first mentioned rollers, said smaller rollers occupying a radial position for lateral retention by only one ring but off from the track thereon for the first-mentioned rollers, the closeness of the series of rollers preventing the smaller rollers from moving out of position for such lateral retention, one or more said smaller rollers being radially displaceable toward said track to loosen the series for assembling or disassembling, and means normally preventing such displacement.

27. A roller bearing comprising concentric rings, interposed rollers tracking thereon, smaller rollers between first-mentioned rollers, said smaller rollers occupying a radial position for lateral retention by only one ring but off from the track thereof for the first-mentioned rollers, one or more of said smaller rollers having an inserted means which retains it in position to tighten the series of rollers sufficiently to preserve the relation stated.

28. A roller bearing comprising concentric rings having roller tracks, interposed rollers bearing on said tracks, flanges on the outer ring laterally embracing said rollers, smaller rollers held by radial thrust toward said flanges and laterally retained thereby, there being clearance between said smaller rollers and the track of said outer ring, at least one of the said smaller rollers having inserted means to hold it in its desired radial position and thereby maintain such closeness of the series of rollers as to maintain the relation stated.

29. A roller bearing comprising concentric rings, interposed rollers tracking thereon, flanges on one of said rings embracing said rollers, smaller rollers held by radial thrust in position for lateral retention by said flanges, said rollers having bearing trunnions which withhold said rollers from the track of the larger rollers, at least one of said smaller rollers having a separate core which provides said trunnions.

30. A roller bearing comprising concentric rings and interposed rollers, including a roller smaller than the space between the bearing tracks of said rings having separable means withholding the same from a bearing track and serving normally to maintain the assembly of the bearing.

31. A roller bearing comprising concentric rings and interposed rollers, said rollers being of two sets of different diameters, there being an independent track for each set of rollers, one or more of the smaller rollers having a separate core which maintains such roller in its proper radial position.

32. A roller bearing comprising rings and rollers mutually retained in assembled relation, and means for locking the assembly including a locking element applicable to an individual roller after the assembly is otherwise completed.

33. In a roller bearing comprising rings and rollers mutually retained in assembled relation, means for locking the assembly including a roller having a plurality of parts constructed to be introduced separately into the assembly.

In testimony whereof, I have signed my name to this specification.

FRANK D. SHELDON.